US006762395B2

United States Patent
Yagnik et al.

(10) Patent No.: US 6,762,395 B2
(45) Date of Patent: Jul. 13, 2004

(54) THERMALLY-CONDUCTIVE, ELECTRICALLY NON-CONDUCTIVE HEAT TRANSFER MATERIAL AND ARTICLES MADE THEREOF

(75) Inventors: Chandrakant M. Yagnik, Austin, TX (US); Roy E. Barth, San Marcos, TX (US); R. Knox Pitzer, San Marcos, TX (US)

(73) Assignee: Thermon Manufacturing Company, San Marcos, TX (US)

( * ) Notice: Subject to any disclaimer, the term of this patent is extended or adjusted under 35 U.S.C. 154(b) by 0 days.

(21) Appl. No.: 10/165,441

(22) Filed: Jun. 7, 2002

(65) Prior Publication Data

US 2003/0034344 A1 Feb. 20, 2003

Related U.S. Application Data

(62) Division of application No. 09/353,675, filed on Jul. 15, 1999, now Pat. No. 6,410,893.
(60) Provisional application No. 60/092,943, filed on Jul. 15, 1998.

(51) Int. Cl.$^7$ .................................................. H05B 3/06
(52) U.S. Cl. ....................... 219/540; 219/544; 219/549; 219/528; 219/535; 219/536; 338/214; 238/122
(58) Field of Search ................................. 219/540, 544, 219/546, 548, 549, 528, 531, 535, 536, 537, 541, 213, 502; 174/137 B, 137 R, 138 J; 338/214, 250; 238/122

(56) References Cited

U.S. PATENT DOCUMENTS

| | | | |
|---|---|---|---|
| 3,798,415 A | | 3/1974 | Graham |
| 3,800,123 A | * | 3/1974 | Maahs ........................ 219/544 |
| 3,834,458 A | | 9/1974 | Bilbro et al. |
| 3,900,654 A | * | 8/1975 | Stinger ....................... 219/528 |
| 4,051,466 A | | 9/1977 | Protze |
| 4,104,509 A | | 8/1978 | Van Bokestal et al. |
| 4,247,756 A | | 1/1981 | Cucinotta et al. |
| 4,281,238 A | | 7/1981 | Noma et al. |
| RE31,081 E | | 11/1982 | Keep, Jr. |
| 4,388,523 A | | 6/1983 | Keep, Jr. et al. |
| 4,391,425 A | | 7/1983 | Keep, Jr. |
| 4,429,845 A | | 2/1984 | Stover et al. |
| 4,626,666 A | | 12/1986 | Maeda et al. |
| 4,650,972 A | | 3/1987 | Cunningham |
| 4,701,598 A | * | 10/1987 | Cooper ....................... 219/535 |
| 4,870,251 A | | 9/1989 | Anemaet |
| 4,922,083 A | * | 5/1990 | Springs et al. .............. 219/549 |
| 4,957,012 A | * | 9/1990 | Cuddihy et al. ............ 219/502 |
| 5,004,190 A | | 4/1991 | Montierth et al. |
| 5,086,836 A | | 2/1992 | Barth et al. |

(List continued on next page.)

FOREIGN PATENT DOCUMENTS

| EP | WO 92/04718 | 10/1991 |
|---|---|---|
| EP | 0 782 153 A1 | 2/1997 |

OTHER PUBLICATIONS

Kirk–Othmer, *Encyclopedia of Chemical Technology*, "Nitrides," pp. 871–886, John Wiley & Sons, Inc., New York 1981.

*Primary Examiner*—Fadi H Dahbour
(74) *Attorney, Agent, or Firm*—Akin Gump Strauss Hauer & Feld, LLP

(57) ABSTRACT

A heat transfer material comprised of a polymeric material and a nitride or oxide is provided and is thermally conductive, but electrically non-conductive. The polymeric material may be silicone rubber, and the nitride or oxide may be aluminum nitride, boron nitride, silicon nitride, aluminum oxide or beryllium oxide. The material is made flexible by adding plasticizer and remains flexible after an extended period of use. A dielectric jacket for an electrical heating cable is thermally conductive and remains flexible so that it can be reused. The heat transfer material can be used on heating devices such as steam tubes and panels, where the heat transfer material does not bond to or adhere to the heated surface, which allows the heating device to be reused.

38 Claims, 3 Drawing Sheets

U.S. PATENT DOCUMENTS

| | | | |
|---|---|---|---|
| 5,113,058 A | * 5/1992 | Srubas et al. | 219/548 |
| 5,194,480 A | 3/1993 | Block et al. | |
| 5,232,970 A | 8/1993 | Solc et al. | |
| 5,250,228 A | 10/1993 | Baigrie et al. | |
| 5,286,952 A | * 2/1994 | McMills et al. | 219/549 |
| 5,512,732 A | * 4/1996 | Yagnik et al. | 219/549 |
| 5,560,851 A | 10/1996 | Thimm et al. | |
| 5,598,502 A | 1/1997 | Takahashi et al. | |
| 5,605,955 A | 2/1997 | Hirai | |
| 5,643,483 A | 7/1997 | Kubota et al. | |
| 5,660,917 A | 8/1997 | Fujimori et al. | |
| 5,681,883 A | 10/1997 | Hill et al. | |
| 5,705,272 A | 1/1998 | Taniguchi | |
| 5,786,565 A | 7/1998 | Wilkens et al. | |
| 5,804,797 A | 9/1998 | Kaimoto et al. | |
| 5,807,507 A | 9/1998 | Hirano et al. | |
| 5,822,675 A | 10/1998 | Paquet et al. | |
| 5,824,997 A | 10/1998 | Reichle et al. | |
| 5,941,482 A | 8/1999 | Santagata | |
| 6,104,010 A | 8/2000 | Reichle et al. | |
| 6,111,234 A | * 8/2000 | Batliwalla et al. | 219/549 |
| 6,194,692 B1 | * 2/2001 | Oberle | 219/528 |
| 6,288,372 B1 | * 9/2001 | Sandberg et al. | 219/544 |
| 6,392,206 B1 | * 5/2002 | Von Arx et al. | 219/540 |
| 6,415,501 B1 | * 7/2002 | Schlesselman et al. | 219/528 |
| 6,433,317 B1 | * 8/2002 | Arx et al. | 219/528 |

* cited by examiner

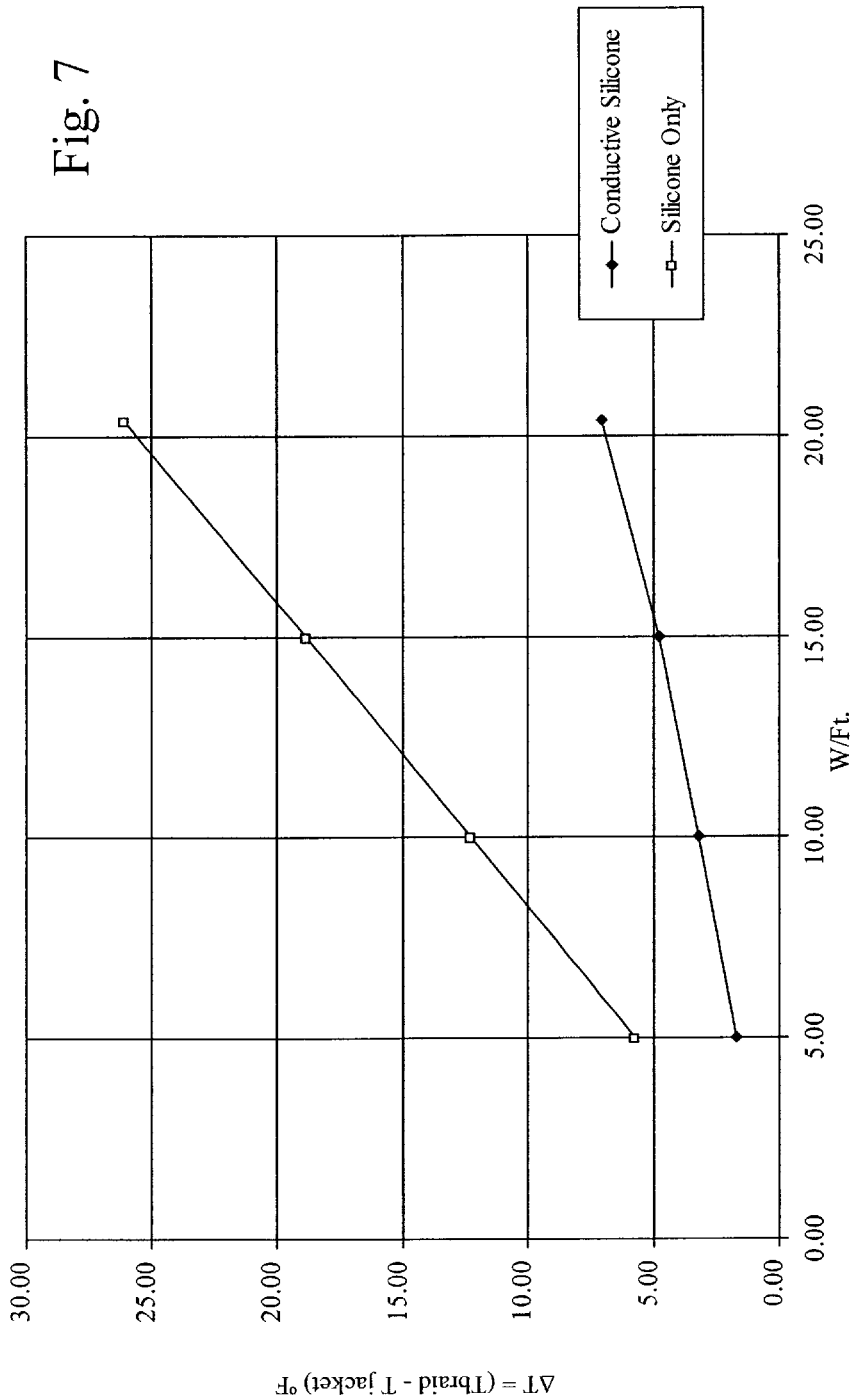

THERMALLY-CONDUCTIVE, ELECTRICALLY NON-CONDUCTIVE HEAT TRANSFER MATERIAL AND ARTICLES MADE THEREOF

CROSS-REFERENCE TO RELATED APPLICATIONS

This application is a divisional of U.S. application Ser. No. 09/353,675, filed Jul. 15, 1999, which claims priority to U.S. Provisional Patent Application No. 60/092,943, filed Jul. 15, 1998, which are incorporated by reference for all purposes.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to heat transfer material and more particularly to one that is thermally conductive, but electrically non-conductive. Articles made with the material include a dielectric jacket for a heating cable, and a thermally conductive, but electrically non-conductive, jacket for a steam/fluid tracer tube as well as thermally conductive strips for bridges between steam/fluid/electrically heated tubes and process piping, vessels, and equipment.

2. Description of the Related Art

The use of thermally conductive materials in heat tracing applications is known in the art. As early as 1954, filled thermally conductive materials were being commercially used in industrial heat tracing applications. Early heat transfer materials for heat tracing used carbon based fillers, such as graphite, loaded into a receiving base material such as sodium silicate, epoxy, etc. These materials were applied in paste form to the exterior of a tube through which steam was passed. The passage of steam through the tube caused the water in the sodium silicate to evaporate. This resulted in the heat transfer material hardening and thus permanently and physically bonding the steam tube to the process pipe to which it was mounted. This physical bonding enhanced the heat transfer between the steam tube and the process pipe and thus resulted in much higher maintenance temperatures on the process pipe than would be experienced by traditional steam tracing methods using no heat transfer material for a given steam/fluid temperature.

In 1974, Bilbro et al. obtained U.S. Pat. No. 3,834,458 for a new heat transfer material which achieved similar results as prior heat transfer materials but allowed for a partially cured conductive material to be snapped in place over the tube and then covered with a containing channel. The advantage here was the heat transfer material became molten and flowed to fill air gaps after steam was passed through the tube. The installation of the heat transfer material was cleaner and faster. The conductivities of the cured heat transfer material of the '458 patent were only slightly less than the previous paste-like heat transfer materials. The heat transfer material disclosed in the '458 patent was also extensively used with electric heat tracers by extruding the heat transfer material onto the electric cable at the factory and then shipping the electric heat tracer to the field on a reel. In the field, the electric cable with the extruded heat transfer cement was installed on a pipe and again covered with a channel.

In recent years, certain applications have been identified where it is not possible to keep the extruded heat transfer cement material, as disclosed in the '458 patent, always beneath a channel. One specific application is the rail heating application. Specifically, when used with rail heating, the electric cable heater has to leave the rail at expansion joints and then after a one or two foot loop return to heat the rail. The prior art heating cable included an extruded thermally conductive and electrically conductive heat transfer material. The heat transfer material contained carbon black, which provides the required thermal conductivity, however, it is also highly electrically conductive.

Since the prior art heat transfer material was electrically conductive, it posed a hazard for electrical shock. Thus, in the past, a thin silicone rubber jacket has been placed around the extruded heat transfer cement material to retain its shape at the excursion points of the heater cable from the rail. Since the rails in many cases were electrically alive (480 to 800 volts DC or AC potential), the silicone jacket material provided electrical insulation—should anyone brush against these loop arounds. Materials other than silicone have also been used for this purpose, one of which is described in U.S. Pat. No. 4,391,425, issued to Keep.

Many other applications also require dielectric jackets, so electrical conductivity of prior art heat transfer materials is often a problem. Due to the composition of the prior art heat transfer material used, the heat transfer material would cure and harden when placed into service. Consequently, prior art heating cable was typically not reusable after it was removed from a heated surface because it became hard and brittle during service. In the rail heating application, when rail replacement was necessary, it also became necessary to replace the heating cable.

Similarly, heat transfer material that has been extruded onto a steam/fluid tracer tube and installed under a channel typically cannot be subsequently removed and reinstalled without damaging the heat transfer material. Most prior art heat transfer materials for steam/fluid tracing bond or adhere to some extent to the heated surface when in service, which again prevents reuse. Where heat transfer material has been used between two tubes, which have high expansion forces, the expansion forces have caused the material to crack.

BRIEF SUMMARY OF THE INVENTION

A thermally conductive, but electrically non-conductive, heat transfer material is provided according to the present invention. For example, a jacket or insulation layer is provided for heating cables for rail heating applications, electric heating and power cables, jacketed steam/fluid tracer tubes, and removable/reusable thermal bridge strips for heat tracing tubes. The thermally conductive, but electrically non-conductive, articles so made are mechanically sturdy, but flexible. Cable, tubes, bridge strips and similar articles can be shipped on a reel to the final destination. A thermally conductive material for heat transfer devices is provided that retains flexibility after use, which has dielectric properties. Articles made with the present heat transfer material do not pose an electrical shock; do not become hard and brittle after use; and do not become bonded to the surface. Yet, the material meets thermal conductivity requirements.

The thermally conductive, electrically non-conductive composition comprises a polymeric material, such as silicone rubber, and a nitride and/or oxide compound as a filler material. Suitable nitride and/or oxide compounds include, but are not limited to, aluminum nitride, boron nitride, silicon nitride, aluminum oxide and beryllium oxide. Compounds that are chemically or physically similar to the specified nitride and oxide compounds may be suitable as well. Preferably, additional plasticizer additives are included to increase the flexibility of the jacket material. The jacket material of the present invention has a thermal conductivity that approaches the thermal conductivities of prior art heat transfer materials, is not electrically conductive, and remains flexible at temperature exposures up to and exceeding 450° F. and does not harden or adhere to the substrate.

A heating cable has a thermally conductive, electrically non-conductive jacket. Such a cable can be installed on a third rail that is usually electrically alive with 480 volts to 800 volts DC or AC potential. The heating cable with a jacket according to the present invention can be installed on a live third rail without a danger of electrical shock to the installer. The thermally conductive, electrically non-conductive jacket will not form a galvanic corrosion (cell) on the carbon steel third rail. The jacket can be extruded onto the cable during manufacture.

A heating cable according to the present invention, with a thermally conductive, electrically non-conductive jacket, can be used in electric heat tracing applications, where reduced element and conductor operating temperatures are advantageous. A composition of material according to the present invention is also useful as a thermally conductive jacket for steam/fluid tube tracers or panels or thermal bridge strips between tracers and the heated surface which allows high heat transfer rates but allows the tracer to be removed and reapplied without sustaining damage to the heat transfer material.

It is desirable to have an improved thermally conductive, electrically non-conductive jacket for heating cable for rail heating applications. It is further desirable to have a thermally conductive jacket for a heat transfer element that retains flexibility after use. Many types of heating and power cable products require dielectric jackets. It would be advantageous for these heating cables to be jacketed with a highly thermally conductive material in order to reduce the inner conductor/element operating temperature. As these jackets are dielectric jackets, they should remain essentially electrically nonconductive. A heat transfer material according to the present invention or jacket, sheath, strip, insulator or covering made of it addresses these desires.

BRIEF DESCRIPTION OF THE SEVERAL VIEWS OF THE DRAWINGS

The objects, advantages, and features of the invention will become more apparent by reference to the drawings which are appended hereto and wherein like numerals indicate like parts and wherein an illustrated embodiment of the invention is shown, in which:

FIG. 7 is a chart illustrating the performance of a heat transfer material according to the present invention.

DETAILED DESCRIPTION OF THE INVENTION

A thermally conductive, but electrically non-conductive, heat transfer material is useful as a jacket or insulation layer for a heating device. The heating device can be, for example, a steam or electrically heated tube, panel, or an electric heating device. A jacket according to the present invention can be extruded onto a heating cable, which is a heating device that is particularly suitable for rail heating applications in addition to numerous other applications. The thermally conductive, but electrically non-conductive, cable so made is mechanically sturdy but flexible so that it can be shipped on a reel to the final destination.

A thermally conductive, electrically non-conductive, heat transfer material according to the present invention is comprised of a polymeric material, such as a silicone rubber, and a filler material that adds thermal conductivity without adding electrical conductivity. The polymeric material is typically silicone rubber, but may be, for example, silicone gels, polyethylene, polypropylene, an elastomer, natural or synthetic rubber, or epoxy. Examples of the filler material include aluminum nitride (AlN), boron nitride (BN), silicon nitride (Si3N4), aluminum oxide (Al2O3), and beryllium oxide (BeO), but compounds or materials exhibiting similar chemical or physical properties may also be suitable. The filler is preferably provided in the range of approximately 30% to 60% by volume and more preferably in the range of 40% to 50% by volume.

In order that the jacket of the present invention be flexible, additional plasticizer additives are included. The plasticizer additives are preferably, but not necessarily, silicone based modifiers such as Silastic HA-2 provided by Dow Corning (STI) Kendalhall, Ind., U.S.A. The plasticizer loading is preferably in the range of approximately 0% to about 15% of filler weight and more preferably in the range of about 5% to about 10% of the filler weight.

One heat transfer material according to this invention is a compounded mixture of silicone rubber and aluminum nitride (AlN) as the filler. The percent filler loading of aluminum nitride is preferably in the range of approximately 30% to 60% by volume and more preferably in the range of 40% to 50% by volume.

The plasticizer loading is preferably in the range of approximately 0% to 15% of filler weight and more preferably in the range of 5% to 10% of the filler weight. Other property enhancers, such as fire retardants and ultra violet inhibitors, may also be used without substantially changing the material's heat transfer performance. Adhesive materials such as silicones and other similar materials can be used to bond, stick or adhere this compound to a substrate if desired.

Figure 1:
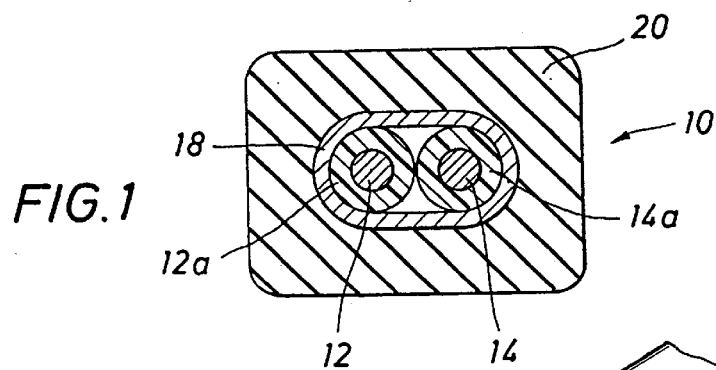
FIG. 1 is a sectional view of a heating cable having a thermally conductive, electrically non-conductive jacket, according to the present invention thereon.

With reference to FIG. 1, a heating cable 10 according to the present invention is illustrated in cross section. Cable 10 has first and second electrical conductors 12 and 14, respectively, which are surrounded by an electrically insulating material 12a and 14a, respectively. A sheath 18 covers electrical conductors 12 and 14, and a jacket 20 covers sheath 18. Jacket 20 is illustrative of the heat transfer material of the present invention. Jacket 20 is a dielectric material, which is electrically non-conducting. Thus, conductors 12 and 14 may have a high voltage potential, yet jacket 20 allows heater cable 10 to be safely touched without electrical shock.

Conductors 12 and 14 generate heat using electrical resistivity, and jacket 20 conducts that heat to a surface that is to be heated. In a prior art cable, an electrically non-conductive jacket or sheath would necessarily cover the heat transfer material to prevent electric shock. Jacket 20 serves as both the heat transfer material and the jacket, since jacket 20 is electrically non-conductive, but thermally conductive.

The thermally conductive, electrically non-conductive jacket of the present invention approaches the conductivities of the prior art heat transfer materials. Additionally, the thermally conductive, electrically non-conductive jacket is flexible at temperature exposures up to and exceeding 450° F. and does not harden or adhere to the substrate.

It is to be understood that the thermally conductive, electrically non-conductive jacket replaces the prior art heat transfer cement material and the silicone rubber jacket of the prior art rail heaters that was required in certain instances due to the electrically conductive prior art heat transfer materials using carbon fillers. Jacket material according to the present invention also replaces the prior art heat transfer cement material used without the silicone rubber jacket. As stated previously, the material of the present invention is an ideal solution for dissipating heat from a high wattage (10 to 70 W/ft) rail heater. This material has a non-electrically conductive surface with a highly thermal conductive capability. Due to the retained flexibility of the jacket material, this material allows rail heaters to be reusable.

Figure 2:
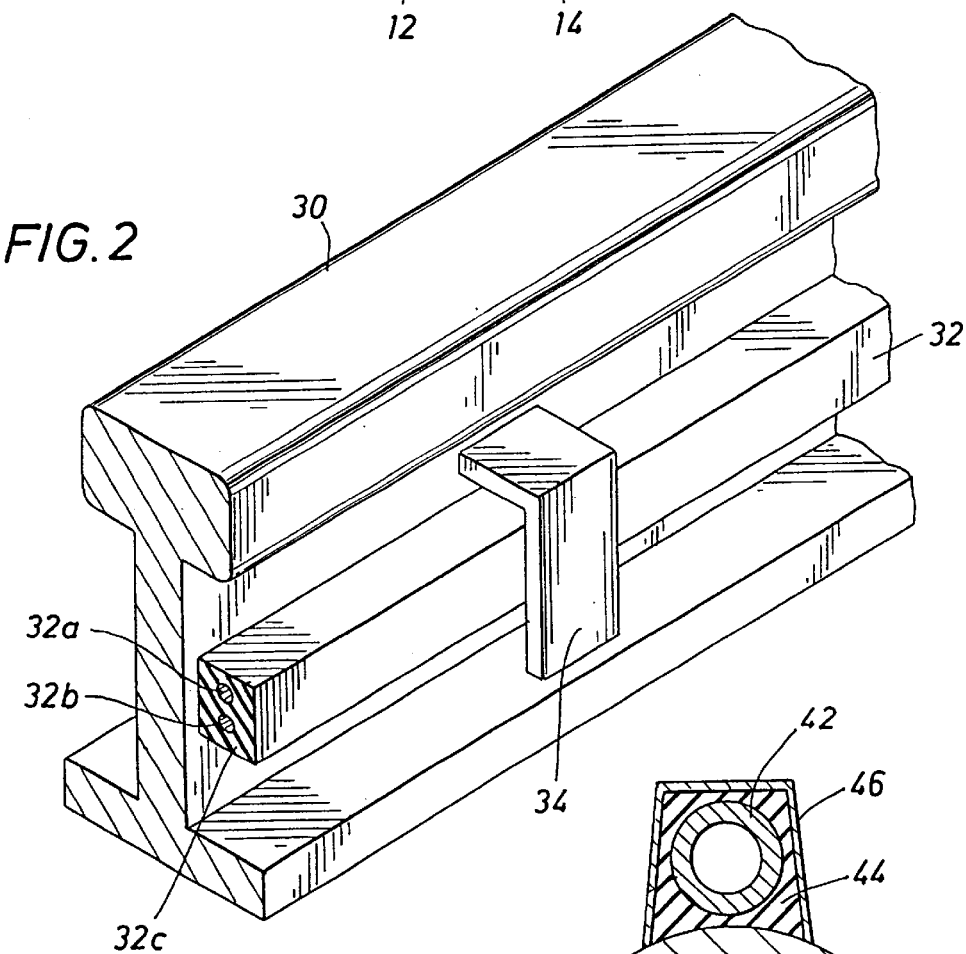
FIG. 2 shows the jacket material of the present invention used with a heating cable and mounted on a rail.

With reference to FIG. 2, a typical rail 30 is heated by a heater cable 32, which is made according to the present invention. Heater cable 10 of FIG. 1 would be suitable for use as heater cable 32 in FIG. 2. Clip 34 secures heater cable 32 to rail 30. Heater cable 32 has wires or conductors 32a and 32b and a jacket 32c, according to the present invention. Where rail 30 joins another rail (not shown), heater cable 32 can have an expansion loop that extends away from the rail. Such expansion loops would be electrical-shock hazards, except heater cable 32 is covered with non-electrically conductive, but thermally conductive, heat transfer material 32c. Thus, a human or an animal can brush against the expansion loop without electrical shock.

Heater cable 32 is covered with a thermally conductive material so that heat generated by its electrical conductors is readily transferred to rail 30. An electrical power source (not shown) is connected to heater cable 32 for providing electrical current for generating heat from heater cable 32. Heater cable 32 does not become hard or brittle, but instead remains flexible during service, even at temperatures as high as 450° F. Thus, a rail may be replaced, and heater cable 32 may be reused.

The jacket material of the present invention is uniquely suitable for a wide range of applications. For example, this new material can, in many instances, replace prior art materials (of the '458 patent) because the jacket material of the present invention has a high conductivity level and is removable and reusable. The present material does not tend to adhere to the heated surface as did the prior art material. Thus, a heat transfer material has been discovered that is electrically non-conductive, while also having advantageous properties including retained flexibility and tendency to not adhere to the heated surface during service.

Figure 3:
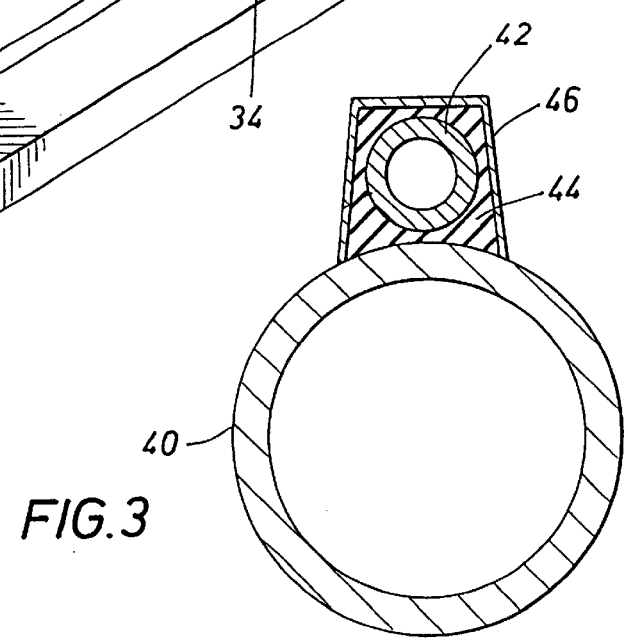
FIG. 3 is a sectional view of the installation of the steam/fluid tracer with the jacket of the present invention on a process pipe.

In FIG. 3, a process pipe 40 carries a process fluid (not shown) that is to be heated according to the present invention. A tube 42 carries a heat transfer fluid, such as steam. A heat transfer material 44, which has a composition according to the present invention, surrounds tube 42. A channel 46 covers heat transfer material 44. Channel 46 is strapped or banded to process pipe 40, but the straps or bands are not shown.

Heat transfer material 44 can be extruded around tube 42 as tube 42 passes through a die in an extruding machine. Heat transfer material 44 can also be extruded without tube 42, in which case it would be installed later around tube 42, such as by providing a longitudinal slit in heat transfer material 44. Tube 42 can then be inserted within heat transfer material 44 through the slit. Heat within tube 42, such as provided by steam, passes readily through heat transfer material 44, which is thermally conductive. However, heat transfer material 44 is electrically non-conductive. Heat transfer material 44 does not tend to bond to pipe 40, and it remains flexible after use. Thus, tube 42, with material 44, can be removed from pipe 40 and reused elsewhere.

Figure 4:
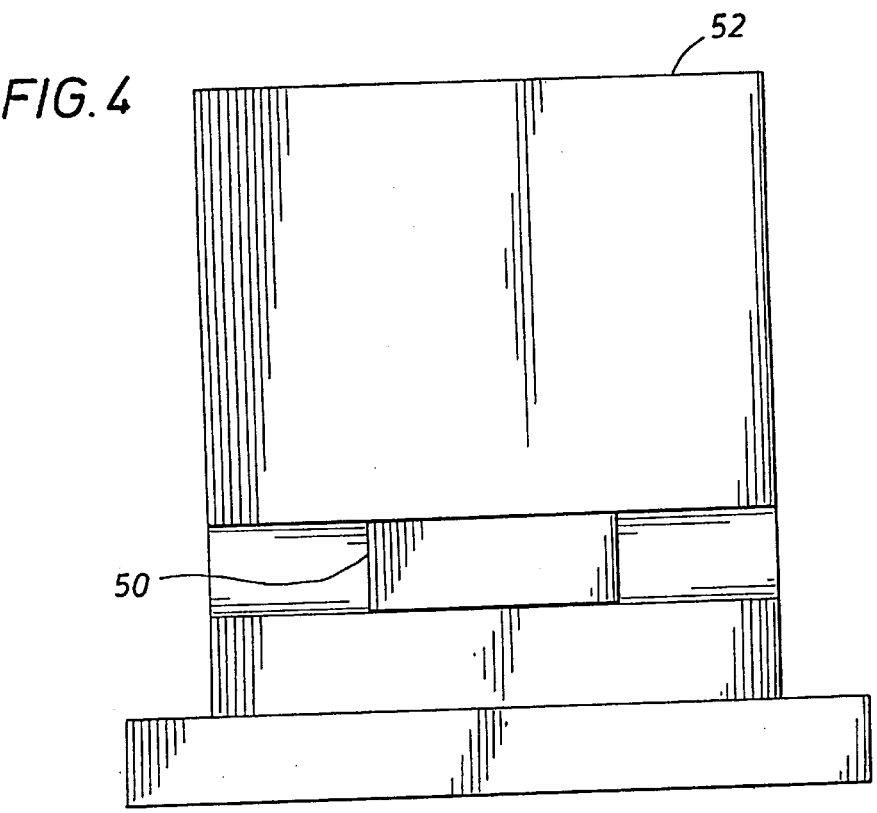
FIG. 4 shows an external steam/fluid panel in service on a tank, pipe or vessel.
Figure 5:
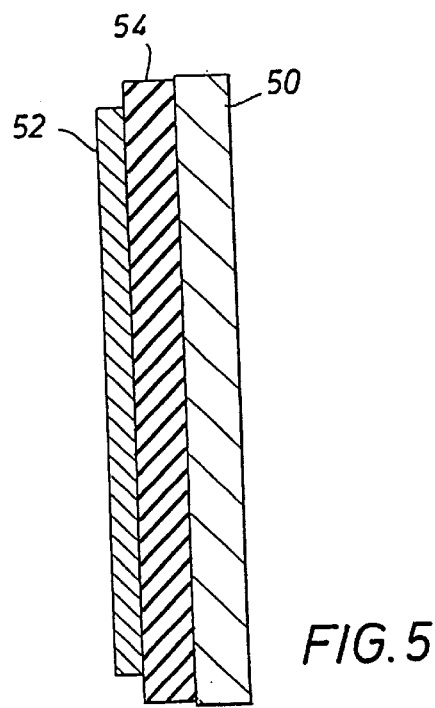
FIG. 5 shows a partial cross section of the panel and heated component of FIG. 4 with a strip of heat transfer material therebetween, according to the present invention.

Likewise, the jacket material of the present invention is well suited for use with external steam/fluid panel heaters, which are a sheet of material that serves as a heat exchanger for heating a tank, vessel or the like. With reference to FIGS. 4 and 5, a metal panel 50 transfers its heat to a vessel wall 52 through a molded sheet 54 of heat transfer material of the present invention. The advantage of the heat transfer material is, again, high heat transfer rates while achieving the unique flexibility, removability, and reusability of the panel.

Figure 6:
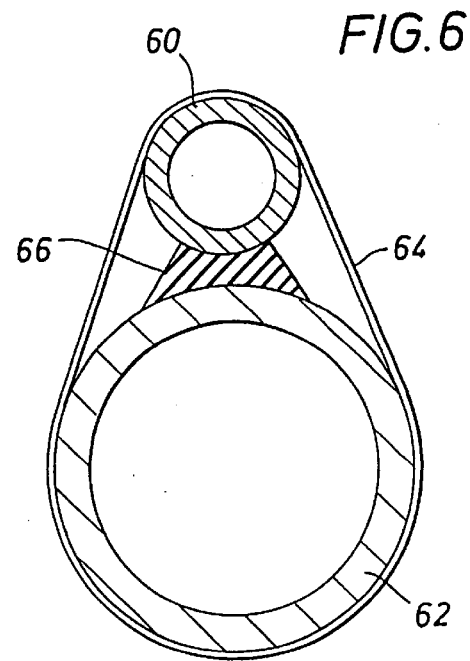
FIG. 6 is a sectional view of a skin-effect heat tube on a process pipe with heat transfer material therebetween, according to the present invention.

Turning to FIG. 6, heat transfer material of the present invention will in many instances replace the present practice of welding of skin-effect heat tubes to process pipes. A skin-effect heat tube 60 is banded to a process pipe 62 by straps 64. A heat transfer material 66 according to the present invention is sandwiched between tube 60 and pipe 62. The advantage of the present invention is that the new jacket material creates a thermal bridge between tube 60 and pipe 62 without physically bonding the tube to the pipe or without the heat transfer material cure-hardening. In the past, prior art materials have not been used due to the potential cracking problems caused by differential thermal expansion between the heat tube and the process pipe. Since heat transfer material 66 remains flexible and does not cure harden, it can accommodate expansion forces without cracking.

It is anticipated that the new level of flexibility and relatively high conductivity of the jacket material of the present invention will be useful in the construction of electric heat tracing cables. The present heat transfer material will enable self-regulating and power limiting heaters to reduce core temperatures and thus increase power output for a given resistivity level. Such heaters will allow constant wattage wire elements to be surrounded by the heat transfer material of the present invention, which serves as electrical insulation with a thermal conductance that allows an increase in the maximum current levels at which these heaters can safely operate.

The claimed thermally conductive, electrically non-conductive heat transfer material can be molded onto steam tracing tubes or other heat transfer surfaces, or molded into shapes to be placed on or between heat transfer surfaces, to provide a heat transfer rate in substantially the same range as prior art heat transfer materials of 0.60 to 5.0 BTU/hr-ft-° F. for ⅜" to ¾" outside diameter tubes while remaining removable and reusable in service.

The heat transfer material of this invention has a substantially reduced electrical conductivity over prior art materials, with an electrical resistivity of 1011 Ohms-cm or higher service. The heat transfer material is removable, reusable and stable to temperature levels in excess of 450° F. Even after extended operation, the heat transfer material does not cling to or adhere to the underlying heated substrate.

The heat transfer material of this invention may be used as new electrical insulation for self-regulating, power limiting, and constant wattage electric heat tracing cables. Self-regulating cables have demonstrated increased power output by 7% or more with reduced operating core temperatures. The material utilizes a flexible heat transfer strip material, which may be operated over the range of −60° F. to 450° F. to form thermal bridges between heaters and the heated substrate. The heat transfer material of this invention has greatly improved burn resistance over prior art carbon loaded conductive materials.

EXAMPLE 1

A TEK 3C40 BN cable sample (from Thermon Manufacturing Co. of San Marcos, Tex., U.S.A.) with a conductive silicone jacket according to the present invention was tested on an 85 lb. composite rail. The purpose of this study was to investigate the heat transfer characteristic of the thermally conductive silicone jacketed cable and compare results with a regular (thermally non-conductive) silicone jacketed cable. The cable has an electrically conductive braid of copper wires and a jacket covering the wires, such as shown in FIG. 1.

An 8.83 foot long TEK 3C40 BN cable sample with thermally conductive silicone jacket was tested on a 8.66 foot long 85 lb. composite rail. A control cable sample (regular silicone jacket) of identical length was also tested. Cable samples were tested at 5, 10, 15, and 20 watts per foot at ambient temperature of approximately 5° F. The rail assembly was tested in a cold chamber.

Very significant temperature reductions (over standard silicone formulations) have been achieved with the new conductive silicone formulation as shown in FIG. 7. The lower the temperature difference between the braid and the exterior of the jacket, the more thermally conductive is the jacket because the jacket efficiently transfers heat from the braid. FIG. 7 shows that the jacket of the present invention is more thermally conductive than a silicone rubber that does not have fillers according to the present invention.

EXAMPLE 2

A RDT 40-600 BN cable sample from Thermon Manufacturing Co. with a thermally conductive silicone jacket was tested on an 85 lb. composite rail. The heat transfer characters of thermally conductive silicone jacketed cable was compared to that of a regular silicone, SureFlow (SFOJ), jacketed cable.

An 8.83 foot long RDT 40-600 BN cable sample with conductive silicone jacket was tested on a 8.66 foot long 85 lb. composite rail. A control cable sample (regular BNSF jacket) of identical length was also tested. J-type thermocouples were located on the cable, jacket, and rail. Cable samples were tested at 5, 10, 20, 30 and 40 watts per foot at an ambient temperature of approximately −6° F. The rail assembly was tested in a cold chamber. The sheath and jacket temperatures were also measured for cable away from the rail. Test results are summaries in Tables 1 and 2. The temperature difference or delta T between the sheath and the jacket is lower for DT 40-600 BN thermally conductive silicone than for RDT 40-600 BNSFOJ when measured on the rail. The thermally conductive jacketed (RDT 40-600) cable runs much cooler (when it is away from the rail) than the cable sample jacketed with the SureFlow (SFOJ).

TABLE 1

W/ft Vs. DeltaT for RDT 40-600 BNSFOJ Cable on Rail

| W/Ft | Average Braid Temperature for Cable on the Rail in ° F. | Average Jacket Temperature for Cable on the Rail in ° F. | $T = T_{braid} - T_{jacket}$ ° F. |
|---|---|---|---|
| 9.90 | 35.23 | 31.80 | 2.57 |
| 20.25 | 78.90 | 72.42 | 6.47 |
| 30.41 | 121.22 | 111.85 | 9.37 |
| 40.82 | 162.65 | 148.27 | 14.37 |

TABLE 2

W/ft Vs. Delta T for RDT 40-600 Conductive Silicone Jacketed Cable on Rail

| W/Ft | Average Braid Temperature for Cable on The Rail in ° F. | Average Jacket Temperature for Cable on the Rail in ° F. | $T = T_{braid} - T_{jacket}$ ° F. |
|---|---|---|---|
| 10.03 | 29.62 | 27.02 | 2.60 |
| 20.13 | 68.32 | 63.72 | 4.60 |
| 29.75 | 110.42 | 103.97 | 6.45 |
| 40.23 | 154.20 | 145.75 | 8.45 |

EXAMPLE 3

Volume resistivity for an insulating material is used to predict the dielectric breakdown of the materials. Volume resistivity was determined for conductive silicone of the present invention, silicone rubber, and graphite loaded heat transfer cement.

Volume resistivity was measured on test samples per ASTM standard D257. A Model 1864 megOhm meter manufactured by General Radio was used for volume resistivity measurements on test samples. Terminal 1 was tied to the—unknown terminal, terminal 2 to the guard, and terminal 3 to the + unknown terminal. Volume resistance was measured at 500 volts for thermally conductive silicone and silicone rubber samples. Volume resistance for graphite loaded heat transfer cement was measured at 60 volts because volume resistance could not be measured at 500 volts as heat transfer cement was too conductive for this measurement at voltage above 70 volts.

Volume resistivity was calculated from measured volume resistance in Ohms, the effective area of the measuring electrode in cm2, and average thickness of the specimen in cm. Table 3 summarizes the test results.

The volume resistivity for the thermally conductive silicone is of the order of 1012 Ohms-cm. The volume resistivity for the thermally conductive silicone is nearly equal to that measured for silicone rubber. The volume resistivity for thermally conductive silicone is 105 times greater than for graphite loaded heat transfer cement.

The thermally conductive heat transfer material of the present invention exhibits essentially the same volume resistivity as regular, untreated silicone rubber, and it exhibits significantly greater volume resistivity than prior art heat transfer material, which is filled or loaded with graphite. Thus, the claimed material is electrically non-conductive, having an electrical resistivity of 1011 Ohms-cm or higher.

TABLE 3

| Sample No. | Sample Description | Sample Thickness (Cm) | Electrode Area (Cm$^2$) | Volume Resistivity (Ohm-Cm) |
|---|---|---|---|---|
| 1 | Thermally Conductive Silicone | 0.30 | 50.26 | $4.33 \times 10^{12}$ |
| 2 | Silicone Rubber | 0.29 | 50.26 | $4.9 \times 10^{12}$ |
| 3 | Graphite Loaded Heat Transfer Cement | 0.21 | 50.26 | $2.8 \times 10^{7}$ |

EXAMPLE 4

Jacket material on high power output cable may see a very high temperature when energized at high ambient temperature environment. Therefore, jacket material should be chosen such that it will not crack during high temperature exposure applications. This test compared RDT 40-600 BN conductive silicone jacket cable samples RDT 406-600 BNSFOJ cable samples, which are made from regular silicone rubber, which are made according to the present invention. Both cables are available from Therman Manufacturing Co. Two one foot long RDT 40-600 BN conductive silicone jacketed cable samples were exposed to 450° F. in an oven for a period of 14 days. Two control samples of RDT 40-600 BNSFOJ (SureFlow with regular silicone jacket) were tested side-by-side at 450° F. for 14 days. At the end of 14 days the oven temperature was brought to room temperature. Samples were removed from the oven and examined visually.

Visual inspection indicated no damage or cracking on the RDT 40-600 BN conductive silicone jacketed cable samples. However, the control samples (RDT 40-600 BNSFOJ) samples had radial cracks all along the samples. Thus, RDT 40-600 BN conductive silicone jacketed cable will not crack when exposed to 450° F., but RDT 40-600 BNSFOJ will crack when exposed to 450° F. RDT 40-600 BN conductive silicone jacketed cable will retain flexibility even after exposure to 450° F., but RDT 40-600 BNSFOJ will lose flexibility when exposed to high temperatures. This test indicates that an article covered with the heat transfer material of the present invention will retain its flexibility after an extended period in service at temperatures as high as 450° F.

EXAMPLE 5

This power output and temperature characteristics of thermally conductive silicone jacketed self-regulating cable samples were examined. Two foot long self-regulating (VSX 20-2) bare cable was tested in an environmental chamber at 50° F. ambient. Type J thermocouples were attached on the cable sample to measure sheath temperature. The cable was energized at 240 volts and a stable current was recorded after twenty minutes. Voltage and amperage were recorded with a Beckman 4410 meter and with an amp clamp. Thereafter, the same cable sample was jacketed with a thermally conductive silicone of the present invention, and power output and temperature measurements were performed in the environmental chamber at an ambient of temperature of 50° F. Finally, thermally conductive silicone was removed from the sample and a thermally non-conductive (regular) silicone was jacketed over the cable. Power output and sheath temperature were again measures at 50° F. in the chamber. Test results are summarized in Table 4.

TABLE 4

| Cable Type And (Length) | DC Resistance at 72° F. (Ohms) | Measured Voltage (Volts) | Stable Amperage (Amps) | Power Output (W/Ft) | Sheath Temperature (° F.) |
|---|---|---|---|---|---|
| VSX 20-2 Bare (2 foot) | 520 | 238 | 0.183 | 21.8 | 149.0 |
| VSX 20-2 with 80 mil silicone conductive jacket (2 foot) | 530 | 239 | 0.195 | 23.3 | 140.8 |
| VSX 20-2 with regular non-conductive 80 mil Silicone jacket (2 foot) | 528 | 238 | 0.175 | 20.8 | 162 |

Power output increased by 7% from bare to thermally conductive silicone jacketed cable. The cable runs cooler by at least 8° F. with a thermally conductive silicone jacket as compared to the bare cable sample. Power output increased by 12% between the thermally conductive silicone jacketed cable versus the regular, thermally non-conductive, silicone jacketed cable sample. Thermally conductive silicone jacketed cable sample runs 20° F. cooler than regular silicone jacketed cable sample. Thus, the power output and temperature characteristics of a jacket according to the present invention is better than that of either a bare, un-jacketed heater or a theater having a conventional silicone jacket.

EXAMPLE 6

The overall heat transfer conductance of a thermally conductive silicone strip was compared to a thermally non-conductive silicone heat transfer strip. Each was extruded onto ⅜" O.D. copper tubing and installed on an oil-filled 8" steel pipe. Two tube strip profiles were installed under galvanized steel channel, such as illustrated in FIG. 3. Stainless steel banding and crimp type seals were used.

Thermocouples were placed on the steam tube at the supply location as well as at the tracer end after exiting the pipe and insulation. All four tracer thermocouples were insulated with 1" fiberglass blanket wrap to ensure accuracy of readings. In addition, thermocouples were located at 90° and 180° away from the tracer and at three locations along the length of the 10 foot long pipe as shown in the below detail. Each tracer was singly supplied with 150 psig steam and allowed to heat up to reach equilibrium prior to the temperature data being recorded.

The approximate overall conductance of the thermally conductive silicone for a ⅜" O.D. tube was calculate at 0.804 BTU/hr-ft-° F. and the non-conductive silicone was calculated to be 0.434 BTU/hr-ft-° F. Thus, the thermal conductivity of a heat transfer material according to the present invention is greater than that of regular silicone rubber. While prior art heat transfer materials have a heat transfer rate ranging between about 0.60 and about 5.0 BTU/hr-ft-° F. for tubes having an outside diameter of ⅜" to ¾", the thermally conductive silicone had a calculated heat transfer rate of about 0.80 BTU/hr-ft-° F.

In summary, a thermally conductive, but electrically non-conductive, heat transfer material is provided. The heat transfer material comprises a polymeric material, such as silicone rubber, and a nitride or oxide compound. The nitride or oxide is preferably selected from a group or compounds including aluminum nitride, boron nitride, silicon nitride, aluminum oxide and beryllium oxide. The nitride or oxide ranges preferably, but not absolutely necessarily, between about 30% and about 60% by volume. A plasticizer is preferably added in an amount of less than or equal to about 15% of the weight of the nitride or oxide for adding flexibility.

The heat transfer material can be used in various articles including a jacket, covering or insulation layer for heating cables. One application is for rail heating, while others include electric heating and power cables, jacketed steam/fluid tracer tubes, and removable/reusable thermal bridge strips for heat tracing tubes. Articles made according to the present invention are mechanically sturdy, while remaining flexible after use. Articles made with the present heat transfer material do not pose an electrical shock as the material has dielectric properties. Such articles do not become hard and brittle after use and do not adhere to the heated surface. The material and articles made therefrom have these desirable properties, as well as meeting thermal conductivity requirements.

A thermally conductive, electrically non-conductive heat transfer material that can be molded onto steam tracing tubes or other heat transfer surfaces or molded into shapes to be placed on or between heat transfer surfaces is provided. The material provides a heat transfer rate in substantially the same range as prior art heat transfer materials of 0.60 to 5.0 BTU/hr-ft-° F. for ⅜" to ¾" outside diameter tubes and remains removable after an extended period in service. The material is thus reusable after the period in service. Thus, a removable and reusable heat transfer material that is stable to temperature levels in excess of 450° F. and does not adhere or cling to the heated substrate in operation is provided.

A heat transfer material having an electrical resistivity of 1011 Ohms-cm or higher is provided. An electrical insulation material for self-regulating, power limiting, constant wattage, and series resistance electric heat tracing cables as well as power conductors/cables is provided. The electrical insulation material has increased power output for self-regulating cable by approximately 7% or higher with reduced operating conductor/element temperatures. A flexible heat transfer strip material which may be operated over the temperature range of approximately −60° F. to 450° F. to form a thermal bridge between a heater and the heated substrate is also provided.

The foregoing disclosure and description of the invention are illustrative and explanatory thereof, and various changes in the details of the illustrated apparatus and construction and method of operation may be made without departing from the spirit of the invention.

We claim:

1. A method of heating railroad rails, comprising the steps of:
   extruding a jacket, having a composition comprising a polymeric material and a nitride or oxide filler material, over two conductors, thereby forming a heating cable;
   securing the heating cable to a rail;
   providing a source of electrical power to the heating cable secured to said rail;
   allowing the electrical power source to generate an electrical current in the heating cable and thereby generate heat; and
   allowing the jacket of the heating cable to transfer heat from the conductors to the rail.

2. The method of claim 1, wherein the polymeric material and the filler material are present in amounts resulting in the jacket having an electrical resistivity of about $10^{11}$ Ohms-cm or higher.

3. The method of claim 2, wherein the polymeric material comprises silicone rubber and the filler material comprises aluminum nitride, and wherein the aluminum nitride comprises between about 30 percent about 60 percent by volume of the jacket.

4. The method of claim 1, wherein the polymeric material comprises silicone rubber and the filler material comprises aluminum nitride.

5. The method of claim 1 wherein the filler material comprises between about 30 percent and about 60 percent by volume of the jacket.

6. A method of heating a substrate, comprising the steps of:
   extruding a heat transfer material, comprising between about 40% and about 70% polymeric material and between about 30% and about 60% of a nitride or oxide filler material, over two electrical conductors thereby forming a flexible heating cable;
   securing the heating cable to the substrate;
   providing an electrical power source to the heating cable;
   allowing the electrical power source to generate an electrical current in the heating cable and thereby generate heat; and
   allowing the heating transfer material to transfer heat from the electrical conductors to the substrate.

7. The method of claim 6, wherein the polymeric material comprises silicone rubber.

8. The method of claim 6, wherein the polymeric material comprises a polyolefin.

9. The method of claim 6, wherein the polymeric material is selected from the group comprising silicone rubber, silicone gels, polyethylene, polypropylene, elastomer, natural rubber, synthetic rubber and epoxy.

10. The method of claim 6, wherein the filler material comprises aluminum nitride.

11. The method of claim 6, wherein the filler material is selected from the group consisting of aluminum nitride, boron nitride, silicon nitride, aluminum oxide and beryllium oxide.

12. The method of claim 6, wherein the filler material comprises between about 40 percent and about 50 percent by volume of the jacket.

13. The method of claim 6, wherein the polymeric material comprises silicone rubber and the filler material comprises aluminum nitride.

14. The method of claim 6, wherein the securing step comprises securing the heating cable to the substrate using an adhesive material.

15. The method of claim 6, wherein the securing step comprises securing the heating cable to the substrate using a silicone adhesive.

16. The method of claim 6, wherein the securing step comprises securing the heating cable to the substrate using a clip, strap, spring or tape.

17. The method of claim 6, wherein the polymeric material and the filler material are present in amounts resulting in the jacket having an electrical resistivity of about $10^{11}$ Ohms-cm or higher.

18. The method of claim 17, wherein the polymeric material comprises silicone rubber and the filler material comprises aluminum nitrate.

19. The method of claim 6, wherein the heating cable comprises a self-regulating cable.

20. The method of claim 6, wherein the heating cable comprises a power limiting cable.

21. The method of claim 6, wherein the heating cable comprises a constant wattage cable.

22. The method of claim 6, wherein the heating cable comprises a flexible cable.

23. A method of heating a substrate, comprising the steps of:
   extruding a jacket, having a composition comprising silicone rubber and a nitride or oxide filler material, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate.

24. The method of claim 23, wherein the polymeric material and the filler material are present in amounts resulting in the jacket having an electrical resistivity of about $10^{11}$ Ohms-cm or higher.

25. A method of heating a substrate, comprising the steps of:
   extruding a jacket, having a composition comprising a polymeric material and aluminum nitride, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate.

26. The method of claim 25, wherein the polymeric material comprises silicone rubber.

27. The method of claim 25, wherein the polymeric material and the filler material are present in amounts resulting in the jacket having an electrical resistivity of about $10^{11}$ Ohms-cm or higher.

28. A method of heating a substrate, comprising the steps of:
   extruding a jacket, having a composition comprising a polymeric material and a nitride or oxide filler material, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate;
   wherein the filler material is selected from the group consisting of aluminum nitride, boron nitride, silicon nitride, aluminum oxide and beryllium oxide.

29. The method of claim 28, wherein the polymeric material and the filler material are present in amounts resulting in the jacket having an electrical resistivity of about $10^{11}$ Ohms-cm or higher.

30. A method of heating a substrate, comprising the steps of:
   extruding a jacket, having a composition comprising a polymeric material and a nitride or oxide filler material, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate;
   wherein the filler material comprises between about 30 percent and about 60 percent by volume of the jacket.

31. The method of claim 30 wherein the filler material comprises between about 40 percent and about 50 percent by volume of the jacket.

32. A method of heating a substrate, comprising the steps of:
   extruding a jacket, having a composition comprising a polymeric material and a nitride or oxide filler material, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate;
   wherein the polymeric material and the filler material are present in amounts resulting in the jacket having an electrical resistivity of about $10^{11}$ Ohms-cm or higher.

33. The method of claim 32, wherein the polymeric material comprises silicone rubber and the filler material comprises aluminum nitride.

34. The method of claim 33, wherein the aluminum nitride comprises between about 30 percent and about 60 percent by volume of the jacket.

35. A method of heating a substrate, comprising the steps of:
   extruding a jacket, having a composition comprising a polymeric material and a nitride or oxide filler material, over two conductors, thereby forming a heating cable;
   securing the heating cable to the substrate;
   providing an electrical power source to the heating cable;
   allowing the electrical power source to generate an electrical current in the heating cable and thereby generate heat; and
   allowing the heating cable jacket to transfer heat from the conductors to the substrate;
   wherein the heating cable comprises a power limiting cable.

36. The method of claim 34, wherein the polymeric material comprises silicone rubber and the filler material comprises aluminum nitride.

37. A method of heating a substrate, comprising the steps of:

extruding a jacket, having a composition comprising a polymeric material and a nitride or oxide filler material, over two conductors, thereby forming a heating cable;

securing the heating cable to the substrate;

providing an electrical power source to the heating cable;

allowing the electrical power source to generate an electrical current in the heating cable and thereby generate heat; and allowing the heating cable jacket to transfer heat from the conductors to the substrate;

wherein the heating cable comprises a constant wattage cable.

38. The method of claim 36, wherein the polymeric material comprises silicone rubber and the filler material comprises aluminum nitride.

* * * * *

UNITED STATES PATENT AND TRADEMARK OFFICE
CERTIFICATE OF CORRECTION

PATENT NO. : 6,762,395 B2
DATED : July 13, 2004
INVENTOR(S) : Yagnik et al.

It is certified that error appears in the above-identified patent and that said Letters Patent is hereby corrected as shown below:

Column 6,
Line 67, replace "with an electrical resistivity of 1011 Ohms-cm or higher" with -- with an electrical resistivity $10^{11}$ Ohms-cm or higher --

Column 8,
Line 56, replace "cone is of the order of 1012 Ohmn-cm." with -- cone is of the order of $10^{12}$ Ohmn-cm. --
Line 67, replace "having an electrical resistivity of 1011 Ohmn-cm or higher" with -- having an electrical resistivity of $10^{11}$ Ohms-cm or higher. --

Column 9,
Line 38, replace "Therman Manu-" with -- Thermon Manu --

Column 10,
Line 65, replace "calculate" with -- calculated". --

Column 11,
Line 51, replace "1011 Ohms-cm or higher is provided." with -- $10^{11}$ Ohms-cm or higher is provided. --

Signed and Sealed this

Twelfth Day of October, 2004

JON W. DUDAS
*Director of the United States Patent and Trademark Office*